(12) United States Patent
Lin et al.

(10) Patent No.: US 10,895,927 B2
(45) Date of Patent: Jan. 19, 2021

(54) TOUCH DISPLAY DEVICE

(71) Applicant: NOVATEK MICROELECTRONICS CORP., HsinChu (TW)

(72) Inventors: Yi-Ying Lin, Hualien (TW); Chih-Chang Lai, Taichung (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 16/702,662

(22) Filed: Dec. 4, 2019

(65) Prior Publication Data
US 2020/0233515 A1 Jul. 23, 2020

Related U.S. Application Data

(60) Provisional application No. 62/795,564, filed on Jan. 23, 2019.

(30) Foreign Application Priority Data

Aug. 26, 2019 (CN) ........................ 2019 1 0794865

(51) Int. Cl.
  *G06F 3/041* (2006.01)
  *G06F 3/044* (2006.01)
(52) U.S. Cl.
  CPC .......... *G06F 3/0412* (2013.01); *G06F 3/0446* (2019.05); *G06F 3/04164* (2019.05)

(58) Field of Classification Search
None
See application file for complete search history.

(56) References Cited

U.S. PATENT DOCUMENTS

| 10,320,186 | B2* | 6/2019 | Kim ...................... G09G 3/2092 |
| 2005/0162353 | A1* | 7/2005 | Kanda ................. H01L 27/3276 |
| | | | 345/76 |
| 2016/0203765 | A1* | 7/2016 | Lee ....................... G09G 3/3291 |
| | | | 345/76 |
| 2016/0260383 | A1* | 9/2016 | Shin ...................... G09G 3/3258 |
| 2017/0365217 | A1* | 12/2017 | An ........................ G09G 3/3233 |

* cited by examiner

*Primary Examiner* — Dorothy Harris

(74) *Attorney, Agent, or Firm* — McClure, Qualey & Rodack, LLP

(57) ABSTRACT

A touch display device including a drive chip and a touch display panel is provided. The drive chip includes a first common voltage source and a second common voltage source. The touch display panel includes a plurality of touch electrode including a plurality of rows and columns, wherein the number of columns is odd-numbered. The touch display panel includes a middle column, a first region and a second region. The middle column is interposed between the first region and the second region having the same number of touch electrodes. The touch electrodes in the first region and that in the second region are coupled to the first common voltage source and the second common voltage source respectively. The middle column is divided into a first half and a second half by a reference line. The first half and the second half have the same number of touch electrodes.

11 Claims, 9 Drawing Sheets

| col | R2 | | | | | | | MC | R1 | | | | | | |
|---|---|---|---|---|---|---|---|---|---|---|---|---|---|---|---|
| row | 1 | 2 | 3 | 4 | 5 | 6 | 7 | 8 | 9 | 10 | 11 | 12 | 13 | 14 | 15 |
| 1 | 505 | 469 | 433 | 397 | 361 | 325 | 289 | 253 | 217 | 181 | 145 | 109 | 73 | 37 | 1 |
| 2 | 506 | 470 | 434 | 398 | 362 | 326 | 290 | 271 | 218 | 182 | 146 | 110 | 74 | 38 | 2 |
| 3 | 507 | 471 | 435 | 399 | 363 | 327 | 291 | 254 | 219 | 183 | 147 | 111 | 75 | 39 | 3 |
| 4 | 508 | 472 | 436 | 400 | 364 | 328 | 292 | 272 | 220 | 184 | 148 | 112 | 76 | 40 | 4 |
| 5 | 509 | 473 | 437 | 401 | 365 | 329 | 293 | 255 | 221 | 185 | 149 | 113 | 77 | 41 | 5 |
| 6 | 510 | 474 | 438 | 402 | 366 | 330 | 294 | 273 | 222 | 186 | 150 | 114 | 78 | 42 | 6 |
| 7 | 511 | 475 | 439 | 403 | 367 | 331 | 295 | 256 | 223 | 187 | 151 | 115 | 79 | 43 | 7 |
| 8 | 512 | 476 | 440 | 404 | 368 | 332 | 296 | 274 | 224 | 188 | 152 | 116 | 80 | 44 | 8 |
| 9 | 513 | 477 | 441 | 405 | 369 | 333 | 297 | 257 | 225 | 189 | 153 | 117 | 81 | 45 | 9 |
| 10 | 514 | 478 | 442 | 406 | 370 | 334 | 298 | 275 | 226 | 190 | 154 | 118 | 82 | 46 | 10 |
| 11 | 515 | 479 | 443 | 407 | 371 | 335 | 299 | 258 | 227 | 191 | 155 | 119 | 83 | 47 | 11 |
| 12 | 516 | 480 | 444 | 408 | 372 | 336 | 300 | 276 | 228 | 192 | 156 | 120 | 84 | 48 | 12 |
| 13 | 517 | 481 | 445 | 409 | 373 | 337 | 301 | 259 | 229 | 193 | 157 | 121 | 85 | 49 | 13 |
| 14 | 518 | 482 | 446 | 410 | 374 | 338 | 302 | 277 | 230 | 194 | 158 | 122 | 86 | 50 | 14 |
| 15 | 519 | 483 | 447 | 411 | 375 | 339 | 303 | 260 | 231 | 195 | 159 | 123 | 87 | 51 | 15 |
| 16 | 520 | 484 | 448 | 412 | 376 | 340 | 304 | 278 | 232 | 196 | 160 | 124 | 88 | 52 | 16 |
| 17 | 521 | 485 | 449 | 413 | 377 | 341 | 305 | 261 | 233 | 197 | 161 | 125 | 89 | 53 | 17 |
| 18 | 522 | 486 | 450 | 414 | 378 | 342 | 306 | 279 | 234 | 198 | 162 | 126 | 90 | 54 | 18 |
| Ref 19 | 523 | 487 | 451 | 415 | 379 | 343 | 307 | 280 | 235 | 199 | 163 | 127 | 91 | 55 | 19 |
| 20 | 524 | 488 | 452 | 416 | 380 | 344 | 308 | 262 | 236 | 200 | 164 | 128 | 92 | 56 | 20 |
| 21 | 525 | 489 | 453 | 417 | 381 | 345 | 309 | 281 | 237 | 201 | 165 | 129 | 93 | 57 | 21 |
| 22 | 526 | 490 | 454 | 418 | 382 | 346 | 310 | 263 | 238 | 202 | 166 | 130 | 94 | 58 | 22 |
| 23 | 527 | 491 | 455 | 419 | 383 | 347 | 311 | 282 | 239 | 203 | 167 | 131 | 95 | 59 | 23 |
| 24 | 528 | 492 | 456 | 420 | 384 | 348 | 312 | 264 | 240 | 204 | 168 | 132 | 96 | 60 | 24 |
| 25 | 529 | 493 | 457 | 421 | 385 | 349 | 313 | 283 | 241 | 205 | 169 | 133 | 97 | 61 | 25 |
| 26 | 530 | 494 | 458 | 422 | 386 | 350 | 314 | 265 | 242 | 206 | 170 | 134 | 98 | 62 | 26 |
| 27 | 531 | 495 | 459 | 423 | 387 | 351 | 315 | 284 | 243 | 207 | 171 | 135 | 99 | 63 | 27 |
| 28 | 532 | 496 | 460 | 424 | 388 | 352 | 316 | 266 | 244 | 208 | 172 | 136 | 100 | 64 | 28 |
| 29 | 533 | 497 | 461 | 425 | 389 | 353 | 317 | 285 | 245 | 209 | 173 | 137 | 101 | 65 | 29 |
| 30 | 534 | 498 | 462 | 426 | 390 | 354 | 318 | 267 | 246 | 210 | 174 | 138 | 102 | 66 | 30 |
| 31 | 535 | 499 | 463 | 427 | 391 | 355 | 319 | 286 | 247 | 211 | 175 | 139 | 103 | 67 | 31 |
| 32 | 536 | 500 | 464 | 428 | 392 | 356 | 320 | 268 | 248 | 212 | 176 | 140 | 104 | 68 | 32 |
| 33 | 537 | 501 | 465 | 429 | 393 | 357 | 321 | 287 | 249 | 213 | 177 | 141 | 105 | 69 | 33 |
| 34 | 538 | 502 | 466 | 430 | 394 | 358 | 322 | 269 | 250 | 214 | 178 | 142 | 106 | 70 | 34 |
| 35 | 539 | 503 | 467 | 431 | 395 | 359 | 323 | 288 | 251 | 215 | 179 | 143 | 107 | 71 | 35 |
| 36 | 540 | 504 | 468 | 432 | 396 | 360 | 324 | 270 | 252 | 216 | 180 | 144 | 108 | 72 | 36 |

TOUCH DISPLAY DEVICE

This application claims the benefit of U.S. provisional application Ser. No. 62/795,564, filed Jan. 23, 2019, and People's Republic of China application Serial No. 201910794865.2, filed Aug. 26, 2019, the subject matters of which are incorporated herein by references.

BACKGROUND OF THE INVENTION

Field of the Invention

The invention relates in general to a touch display device.

Description of the Related Art

Touch display panel has been widely used in various types of electronic devices, such as smart phones and PC tablets. In the touch with display driver integration (TDDI) architecture, all touch sensing electrodes, during the display time, are regarded as a common electrode receiving a common electrode voltage. Under the circumstances that two common voltage sources are respectively disposed at the left and the right of the touch display panel, if the difference between the resistive load of the common voltage source disposed at the left half and the resistive load of the common voltage source disposed at the right half is too large, the display brightness on the left half of the display frame will be different from that on the right half of the display frame and split-screen visual effect will be generated.

SUMMARY OF THE INVENTION

According to an embodiment of the present invention, a touch display device including a drive chip and a touch display panel is provided. The drive chip includes a first common voltage source and a second common voltage source. The touch display panel includes a plurality of touch electrodes. The touch electrodes include a plurality of rows and a plurality of columns, wherein the number of columns is odd-numbered. The touch display panel includes a middle column, a first region and a second region. The middle column is a column of touch electrodes interposed between the first region and the second region. The first region and the second region have the same number of touch electrodes. The touch electrodes in the first region are coupled to the first common voltage source. The touch electrodes in the second region are coupled to the second common voltage source. The middle column is divided into a first half and a second half by a reference line. The first half and the second half have the same number of touch electrodes. A half of the touch electrodes of the first half are coupled to the first common voltage source. The other half of the touch electrodes of the first half are coupled to the second common voltage source. A half of the touch electrodes of the second half are coupled to the first common voltage source. The other half of the touch electrodes of the second half are coupled to the second common voltage source.

According to another embodiment of the present invention, a touch display device including a drive chip and a touch display panel is provided. The drive chip includes a first common voltage source and a second common voltage source. The touch display panel includes a plurality of touch electrode. The touch electrodes include a plurality of rows and a plurality of columns, wherein the number of columns is odd-numbered. The touch display panel includes a regular region and an irregular region. The regular region includes a middle column, a first region and a second region. The middle column is a column of touch electrodes interposed between the first region and the second region. The first region and the second region have the same number of touch electrodes. The touch electrodes in the first region are coupled to the first common voltage source. The touch electrodes in the second region are coupled to the second common voltage source. The middle column is divided into a first half and a second half by a reference line. The first half and the second half have the same number of touch electrodes. A half of the touch electrodes of the first half are coupled to the first common voltage source. The other half of the touch electrodes of the first half are coupled to the second common voltage source. A half of the touch electrodes of the second half are coupled to the first common voltage source. The other half of the touch electrodes of the second half are coupled to the second common voltage source.

The above and other aspects of the invention will become better understood with regards to the following detailed description of the preferred but non-limiting embodiment (s). The following description is made with reference to the accompanying drawings.

BRIEF DESCRIPTION OF THE DRAWINGS

FIG. 2 is an arrangement diagram of the pins coupled to the touch electrodes according to an embodiment of the invention.

FIG. 4 is an arrangement diagram of the pins coupled to the touch electrodes according to another embodiment of the invention.

DETAILED DESCRIPTION OF THE INVENTION

Figure 1A:
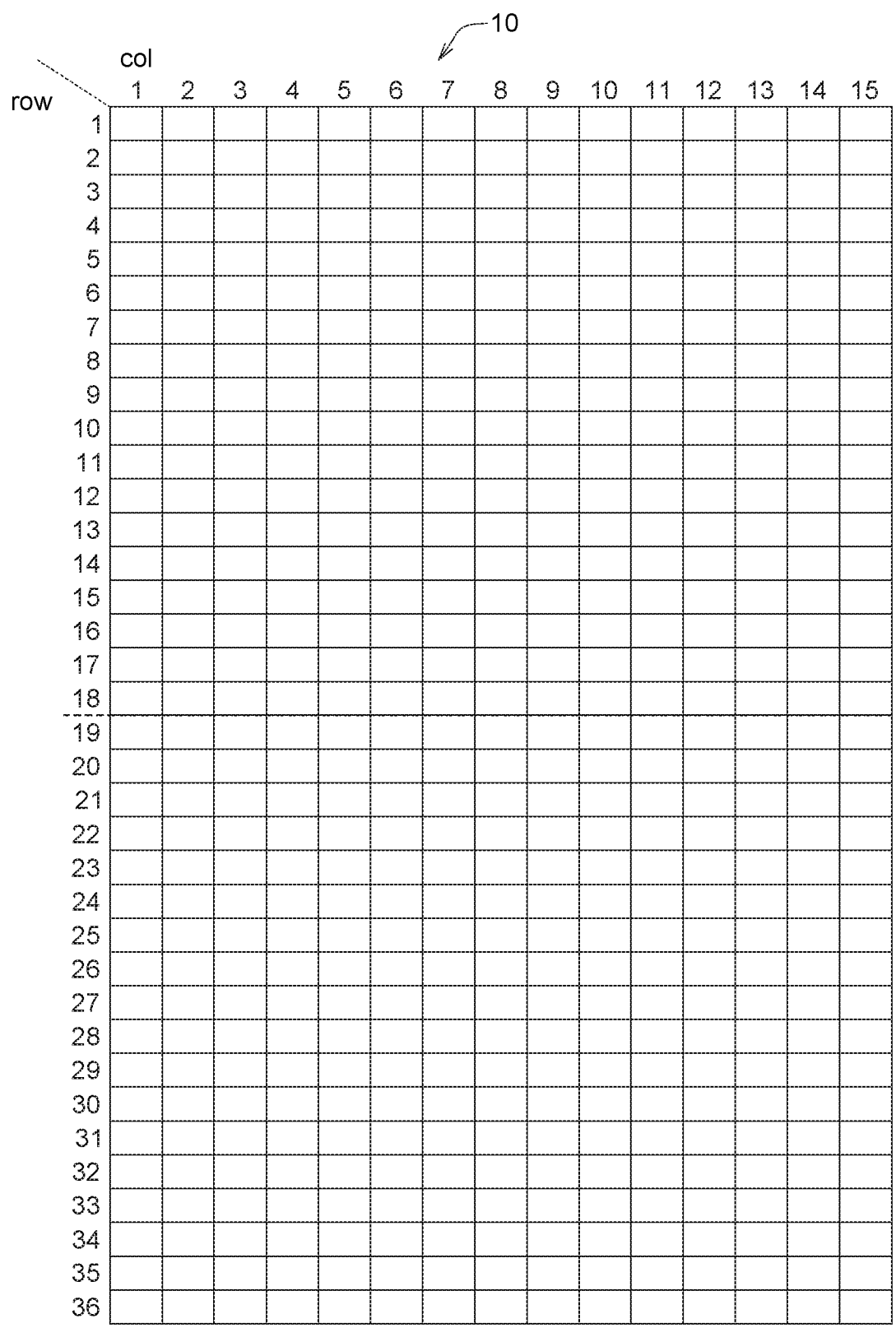
FIG. 1A is a schematic diagram of a touch display panel according to an embodiment of the invention.
Figure 1B:
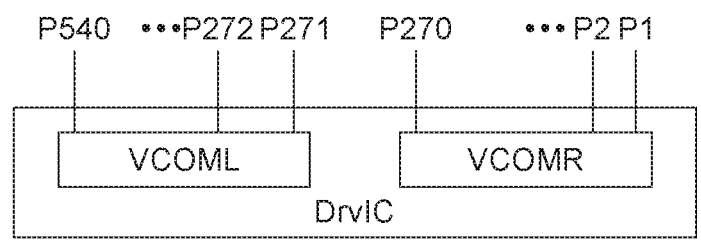
FIG. 1B is a schematic diagram of a drive chip used in the touch display panel according to an embodiment of the invention.

Refer to FIGS. 1A and 1B. FIG. 1A is a schematic diagram of a touch display panel according to an embodiment of the invention. FIG. 1B is a schematic diagram of a drive chip used in the touch display panel according to an embodiment of the invention. The touch display device includes a touch display panel 10 (FIG. 1A) and a drive chip DrvIC (FIG. 1B). The touch display panel 10 includes a plurality of touch electrodes denoted by blocks in FIG. 1A. The touch electrodes include m rows and n columns, wherein both m and n are positive integers, and n is an odd number. In the present embodiment, m is exemplified by 36 and n is exemplified by 15. The drive chip DrvIC can be disposed on the upper side or the lower side of the touch electrodes of FIG. 1A. The drive chip DrvIC includes a plurality of pins P1~P540, a first common voltage source VCOMR and a second common voltage source VCOML. The pins of the drive chip DrvIC are divided into a first portion (including pins P1~P270) and a second portion (including pins P271~P540), wherein the pins P1~P270 of the first portion are connected to the first common voltage source VCOMR, and the pins P271~P540 of the second portion are connected to the second common voltage source VCOML. The pins P1~P540 of the drive chip DrvIC are respectively coupled to one of the touch electrodes by one or multiple traces. In other words, a half (that is, 270) of touch electrode will be coupled to the pins P1~P270 of the first portion and the other half of touch electrodes will be coupled to the pins P271~P540 of the second portion. In the present embodiment, the touch electrode columns col 1~col 7 and the touch electrode columns col 9~col 15 can be symmetrically allocated to the second common voltage source VCOML and the first common voltage source VCOMR with respect to the touch electrode column col 8. However, the touch electrode column col 8 needs to be particularly arranged. To avoid the difference between the resistive load of the first common voltage source VCOMR and the resistive load of the second common voltage source VCOML being to large and causing split-screen visual effect, the invention provides a trace arrangement which makes the resistive load of the first common voltage source VCOMR and the resistive load of the second common voltage source VCOML close to or substantially equivalent to each other.

The touch electrode includes a middle column MC, a first region R1 and a second region R2. The middle column MC is a column of touch electrodes arranged in the middle of touch electrodes. In the present embodiment, the middle column MC is exemplified by touch electrode column col 8. The first region R1 includes the touch electrode columns col 1~col 7 arranged on a first side (such as the left side) of the middle column MC and the second region R2 includes the touch electrode columns co9 1~col 15 arranged on a second side (such as the right side) of the middle column MC. As indicated in FIG. 2, the touch electrodes in the first region R1 can be coupled to the second common voltage source VCOML through the traces and the pins P289~P540 of the second portion, and the touch electrodes in the second region R2 can be coupled to the first common voltage source VCOMR through the traces and the pins P1~P252 of the first portion. As indicated in FIG. 2, the numeral in each block represents the pin to which the touch electrode denoted by the block is coupled, the blocks with dots represent the touch electrodes coupled to the second common voltage source VCOML, and the blocks with slashes represent the touch electrodes coupled to the first common voltage source VCOMR. For example, the touch electrode in the first row and the first column (that is, the top left corner) is coupled to the second common voltage source VCOML through the trace and the pin P505, and the rest can be obtained by the same analogy. The touch electrodes of the middle column MC are divided into a first half H1 and a second half H2 by a reference line Ref. The first half H1 and the second half H2 include the same number of touch electrodes. In the present embodiment, the first half H1 includes 18 touch electrodes from the first row to the 18-th row of the middle column MC, and the second half H2 includes 18 touch electrodes from the 19-th row to the 36-th row of the middle column MC. A half of the touch electrodes of the first half H1 are coupled to the first common voltage source VCOMR through the traces and the pins of the first portion, and the other half of the touch electrodes of the first half H1 are coupled to the second common voltage source VCOML through the traces and the pins of the second portion. A half of the touch electrodes of the second half H2 are coupled to the first common voltage source VCOMR through the traces and the pins of the first portion, and the other half of the touch electrodes of the second half H2 are coupled to the second common voltage source VCOML through the traces and the pins of the second portion. Preferably, an arrangement of the common voltage sources of the first half H1 and an arrangement of the common voltage sources of the second half H2 are mirror symmetric with respect to the reference line Ref, wherein the arrangement of common voltage sources is a relationship between the touch electrodes of the first half H1 and the second half H2 and the first common voltage source VCOMR and the second common voltage source VCOML. For example, the arrangement of FIG. 2 allows the total length of the traces coupled between the pins of the first portion P1~P270 and the touch electrodes to be close to or substantially equivalent to the total length of the traces coupled between the pins of the second portion P271~P540 and touch electrode. In other words, under the circumstances that the traces have the same width, the resistive load of the first common voltage source VCOMR and the resistive load of the second common voltage source VCOML will be close to or substantially equivalent to each other.

Figure 3A:
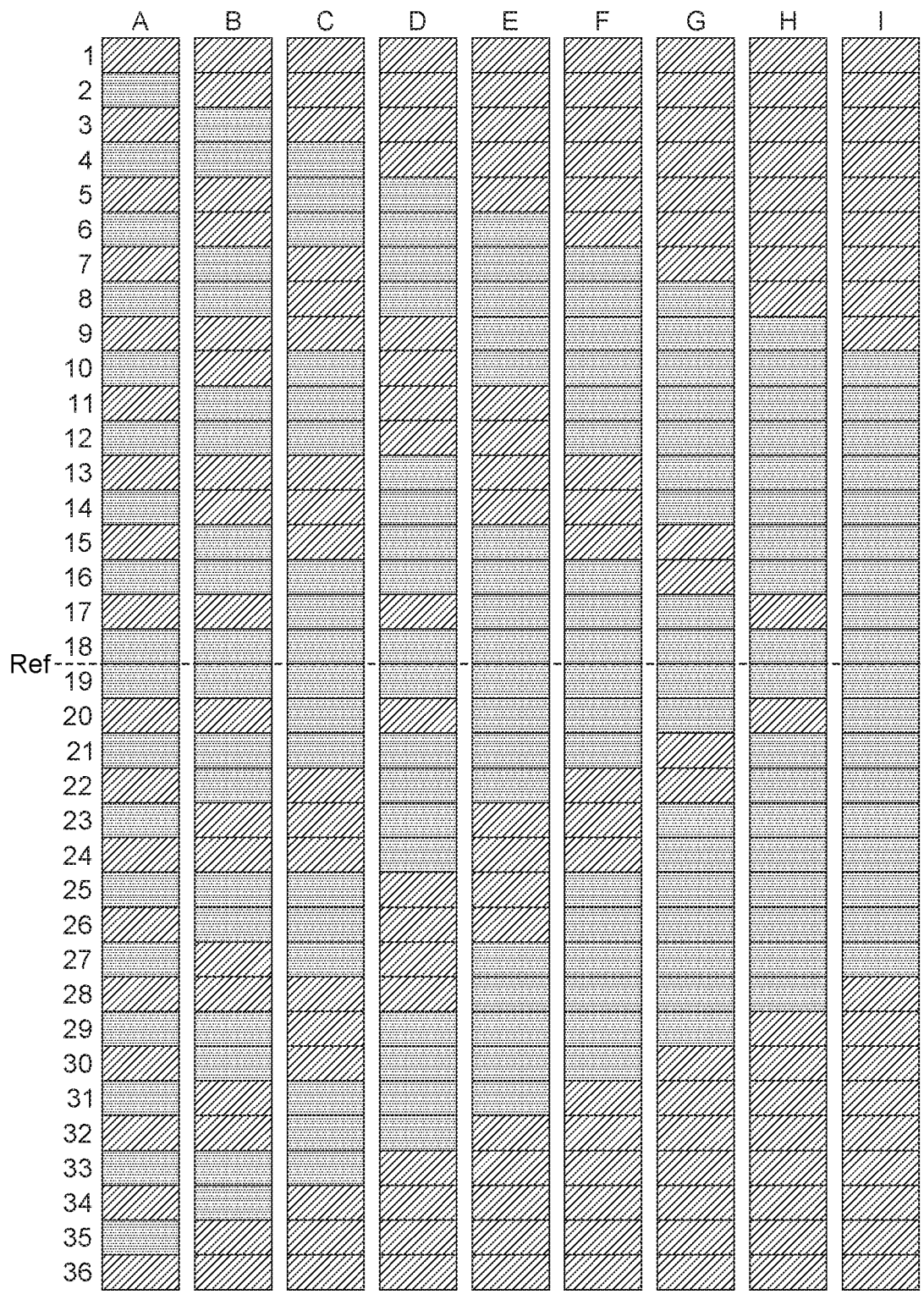
FIGS. 3A and 3B are schematic diagrams of the implementations A-R of the common voltage sources of the touch electrode in the middle column.
Figure 3B:
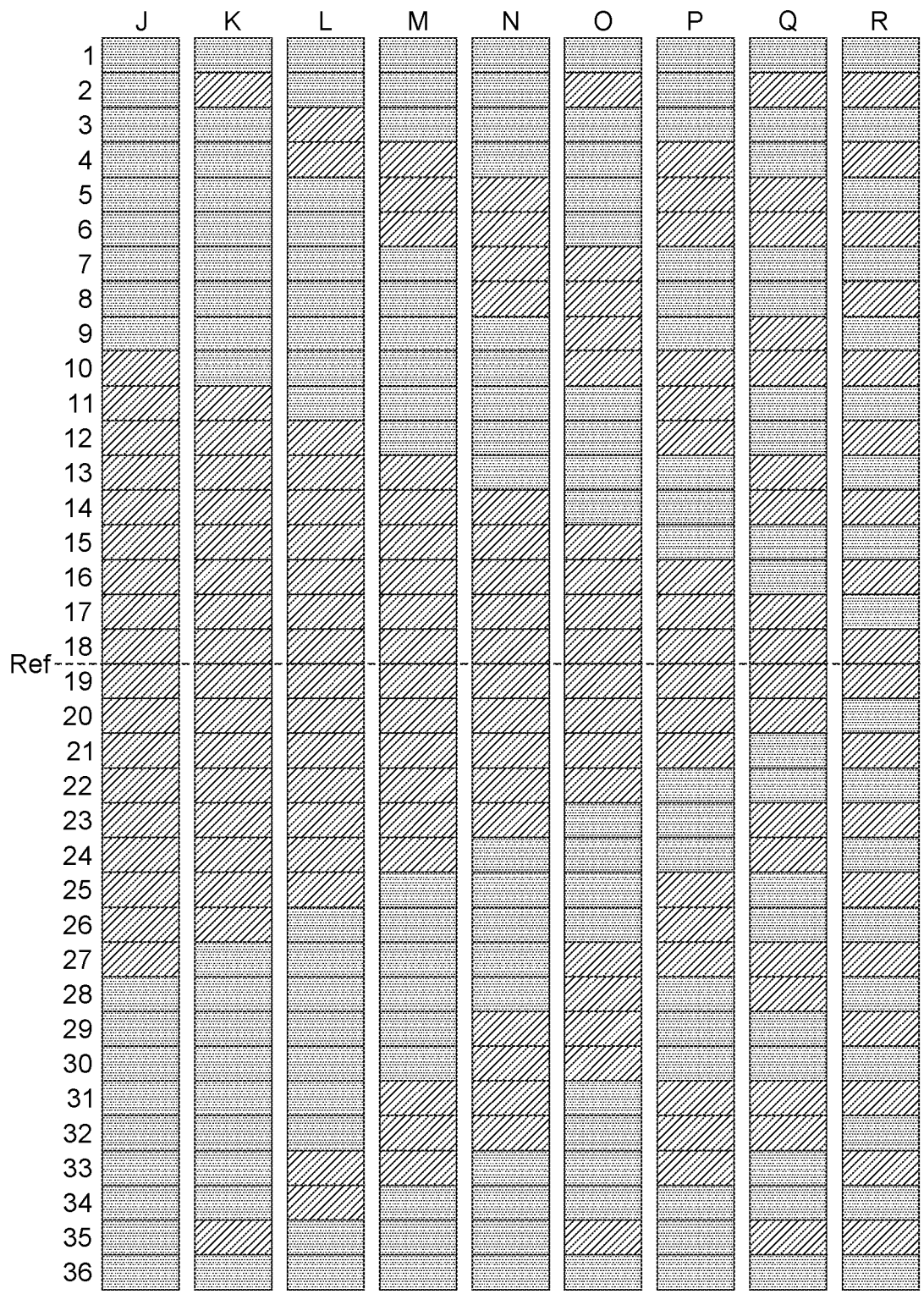

FIG. 3A is a schematic diagram of implementations A~I of the arrangements of the first common voltage source and the second common voltage source of the touch electrodes in the middle column. FIG. 3B is a schematic diagram of implementations J~R of the arrangements of the first common voltage source and the second common voltage source of the touch electrodes in the middle column. As indicated in FIGS. 3A and 3B, the blocks with dots represent the touch electrodes of the middle column coupled to the second voltage source VCOML through the traces and the pins of the second portion, and the blocks with slashes represent the touch electrodes of the middle column coupled to the first voltage source VCOMR through the traces and the pins of the first portion.

Figure 4:
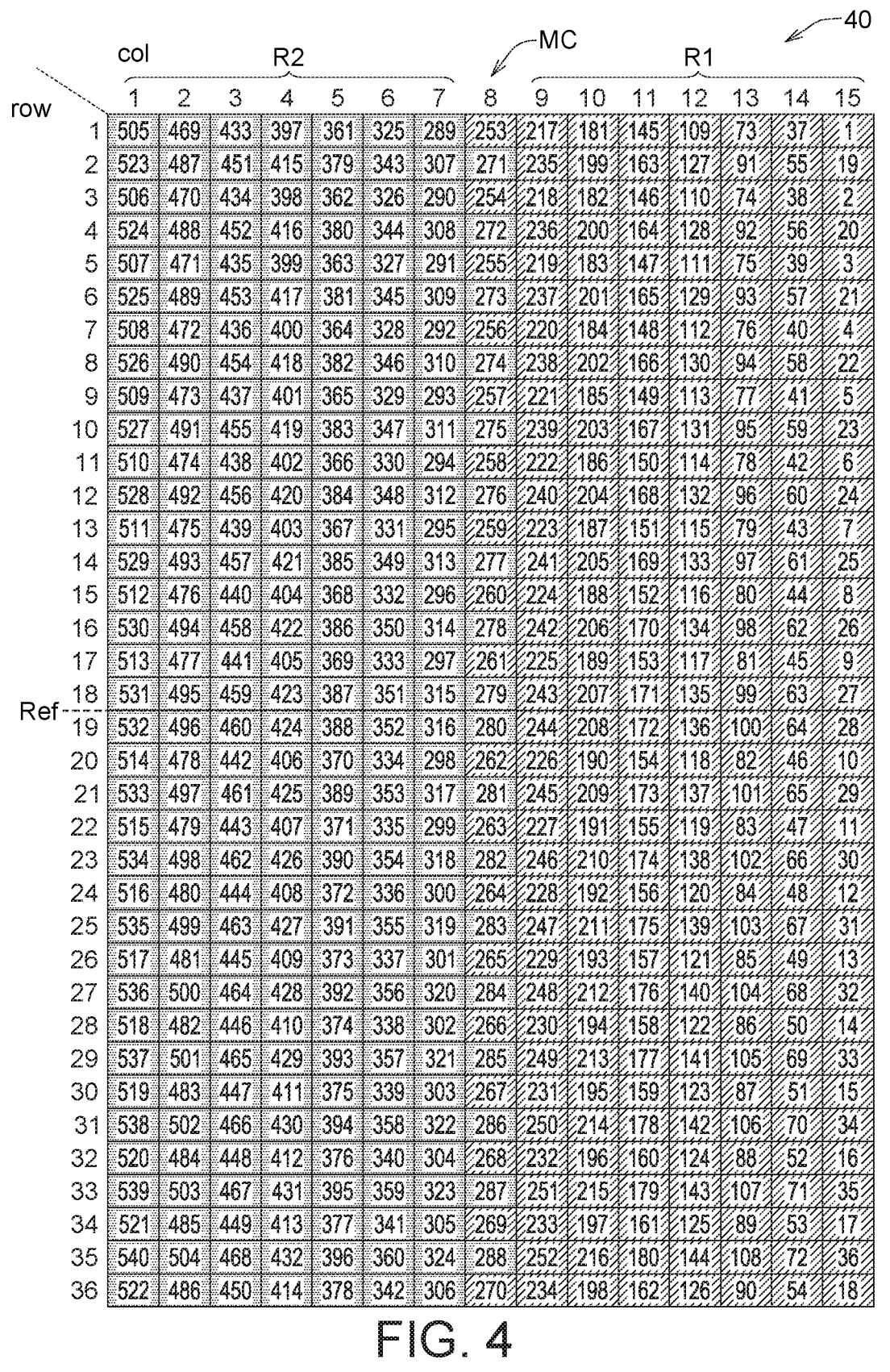

Referring to FIG. 4, an arrangement diagram of the pins coupled to the touch electrodes according to another embodiment of the invention is shown. The embodiment of FIG. 4 and the embodiment of FIG. 2 are similar but are different in the arrangement of the pins coupled to the touch electrodes. In FIG. 2, the numerals of the pins coupled to the touch electrodes excluding the middle column MC are arranged according to an ascending order from top to down and from right to left. In FIG. 4, the pins coupled to the touch electrodes excluding the middle column MC are not arranged according to the numerals of the pins.

Figure 5A:
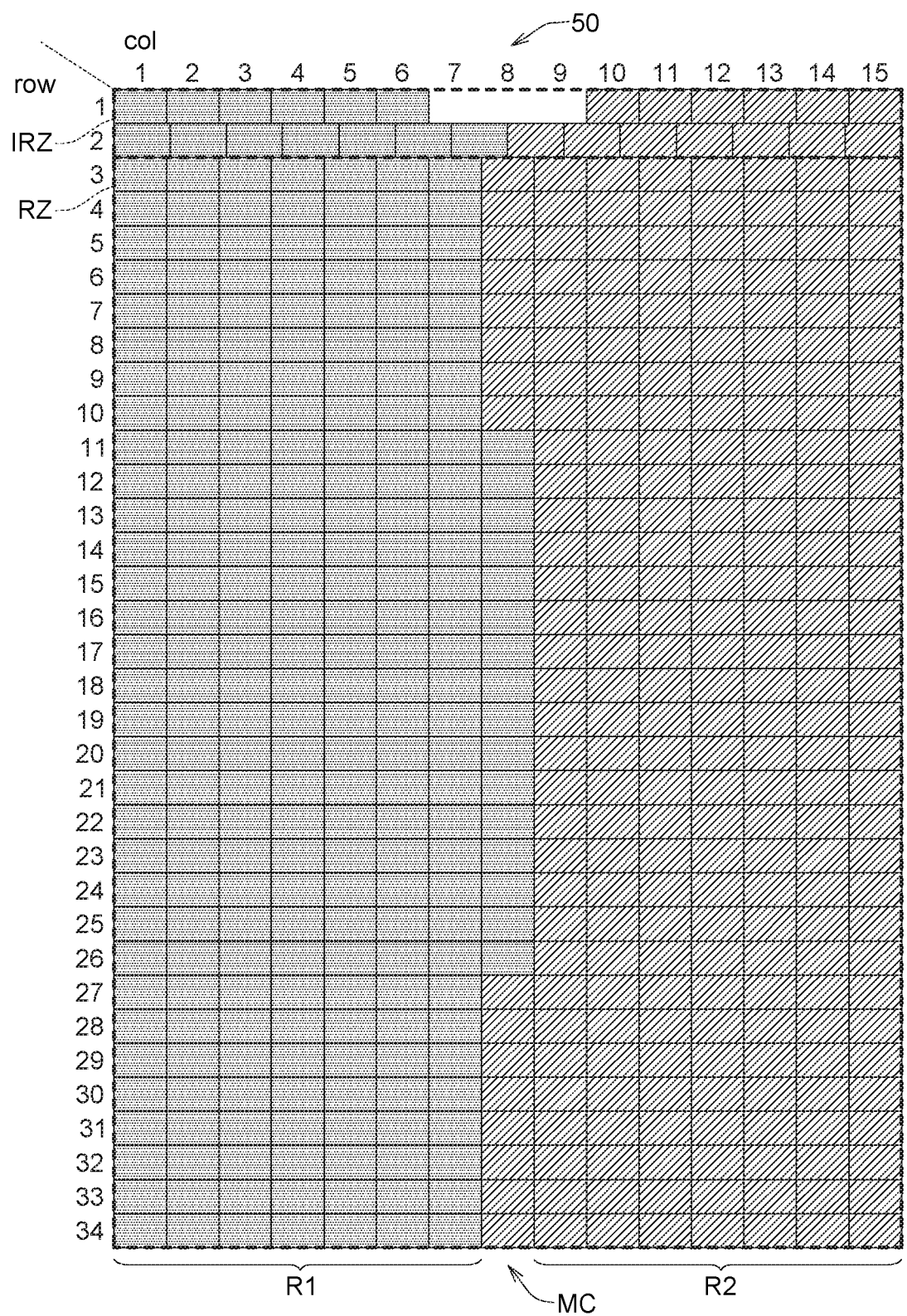
FIGS. 5A and 5B are arrangement diagrams of the common voltage sources coupled to the touch electrodes according to an alternate embodiment of the invention.

Referring to FIG. 5A, an arrangement diagram of the first common voltage source and the second common voltage source coupled to the touch electrodes according to an alternate embodiment of the invention is shown. The touch display panel 50 includes a plurality of touch electrodes (denoted by blocks) including a plurality of rows and a plurality of columns, wherein the number of columns is odd-numbered. In the present embodiment, the shape of the touch display panel 50 is an incomplete rectangle, that is, the touch electrodes from col 7 to col 9 of row 1 are missing (for example, these touch electrodes are removed due to design consideration). The touch display panel 50 includes a regular region RZ and an irregular region IRZ. The regular region RZ includes the touch electrodes from row 3 to row 34, which form a complete rectangular (or squared) region. The irregular region IRZ includes the touch electrodes from row 1 to row 2, which form an irregular region. The number of columns of the touch electrodes in the regular region RZ is odd-numbered, and the number of rows is even-numbered, and preferably is a multiple of 4. The regular region RZ includes a middle column MC, a first region R1 and a second region R2. The arrangement of the first common voltage source or the second common voltage source coupled to the touch electrodes in the regular region RZ is similar to that of above embodiments. That is, the touch electrodes in the first region R1 are coupled to the second common voltage source VCOML (that is, the common voltage source on the left side of the drive chip) through the traces and the pins of the second portion (that is, the pins on the left half of the drive chip), and the touch electrodes in the second region R2 are coupled to the first common voltage source VCOMR (that is, the common voltage source on the right side of the drive chip) through the traces and the pins of the first portion (that is, the pins on the right half of the drive chip). The touch electrodes in the middle column MC are divided into a first half H1 and a second half H2 by a reference line Ref, wherein the first half H1 and the second half H2 have the same number of touch electrodes. A half of touch electrodes of the first half H1 are coupled to the first common voltage source VCOMR (that is, the common voltage source on the right side of the drive chip) through the traces and the pins of the first portion (that is, the pins on the right half of the drive chip), and the other half of touch electrodes of the first half H1 are coupled to the second common voltage source VCOML (that is, the common voltage source on the left side of the drive chip) through the traces and the pins of the second portion (that is, the pins on the left half of the drive chip). A half of touch electrodes of the second half H2 are coupled to the first common voltage source VCOMR (that is, the common voltage source on the right side of the drive chip) through the traces and the pins of the first portion (that is, the pins on the right half of the drive chip), and the other half of touch electrodes of the second half H2 are coupled to the second common voltage source VCOML (that is, the common voltage source on the left side of the drive chip) through the traces and the pins of the second portion (that is, the pins on the left half of the drive chip). The common voltage source of the first half H1 and the second half H2 are mirror symmetric with respect to the reference line Ref.

In the irregular region IRZ, row 1 has an even number of touch electrodes (12 in total), which can be equally allocated to the first common voltage source VCOMR and the second common voltage source VCOML. That is, of the touch electrodes in row 1, col 1 to col 6 are allocated to the second common voltage source VCOML, and col 10 to col 15 are allocated to the first common voltage source VCOMR. The 15 touch electrodes in row 2 are re-arranged as 14 touch electrodes by way of merging and pitch shift of contacts, wherein the 7 touch electrodes on the left side of the re-allocated 14 touch electrodes are allocated to the second common voltage source VCOML, and the 7 touch electrodes on the right side of the re-allocated 14 touch electrodes are allocated to the first common voltage source VCOMR.

Through the above arrangement, the resistive load of the first common voltage source VCOMR and the resistive load of the second common voltage source VCOML will be close to or substantially equivalent to each other.

Figure 5B:
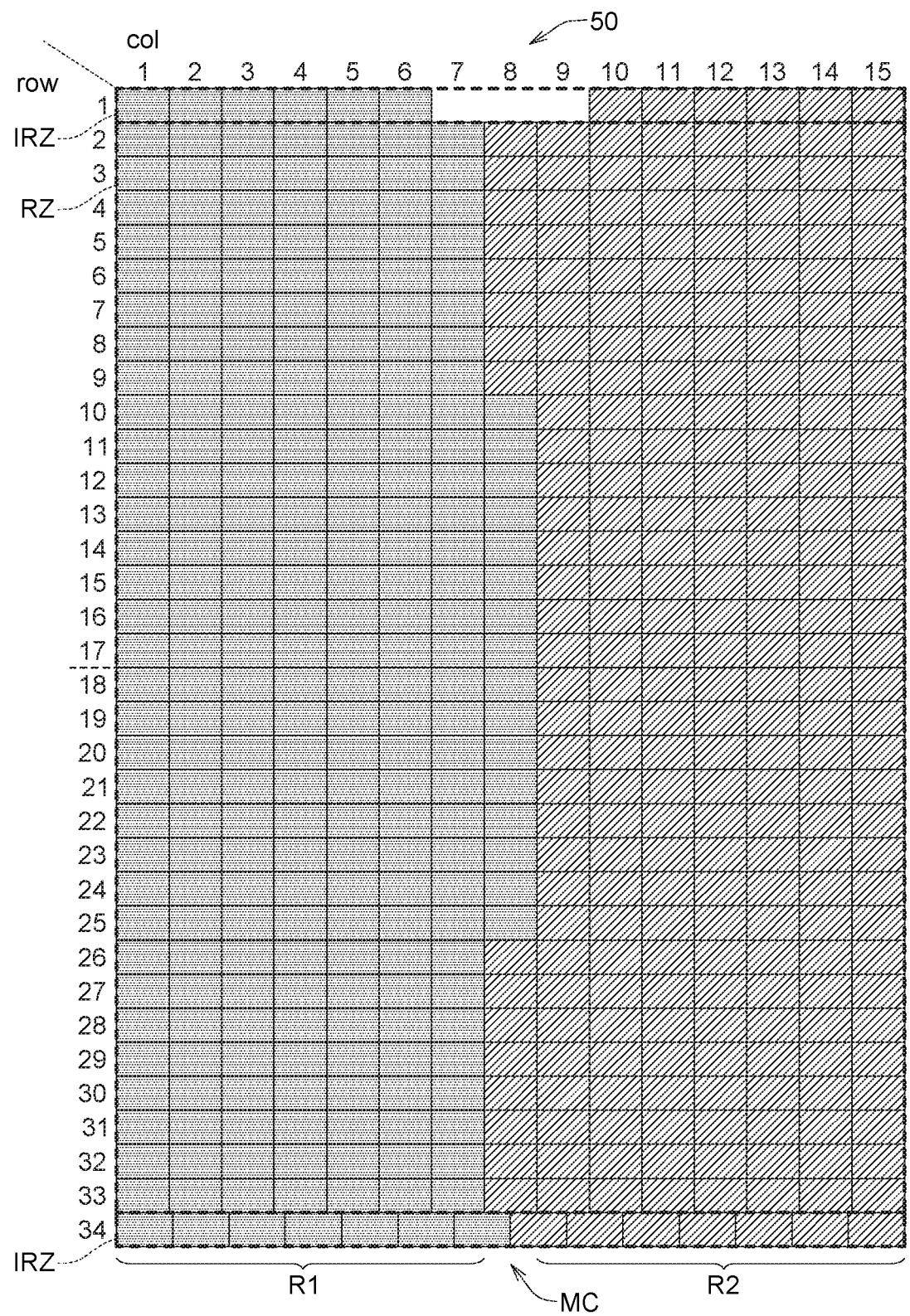

The embodiment of FIG. 5B is similar to the embodiment of FIG. 5A but is different from the same in that the regular region RZ includes touch electrodes from row 2 to row 33, and the irregular region IRZ includes touch electrodes from row 1 and row 34, wherein the 15 touch electrodes in row 34 is re-arranged as 14 touch electrodes by way of merging and pitch shift of contacts, the 7 touch electrodes on the left side of the re-allocated 14 are allocated to the second common voltage source VCOML, and the 7 touch electrodes on the right side of the re-allocated 14 touch electrodes are allocated to the first common voltage source VCOMR.

Figure 6:
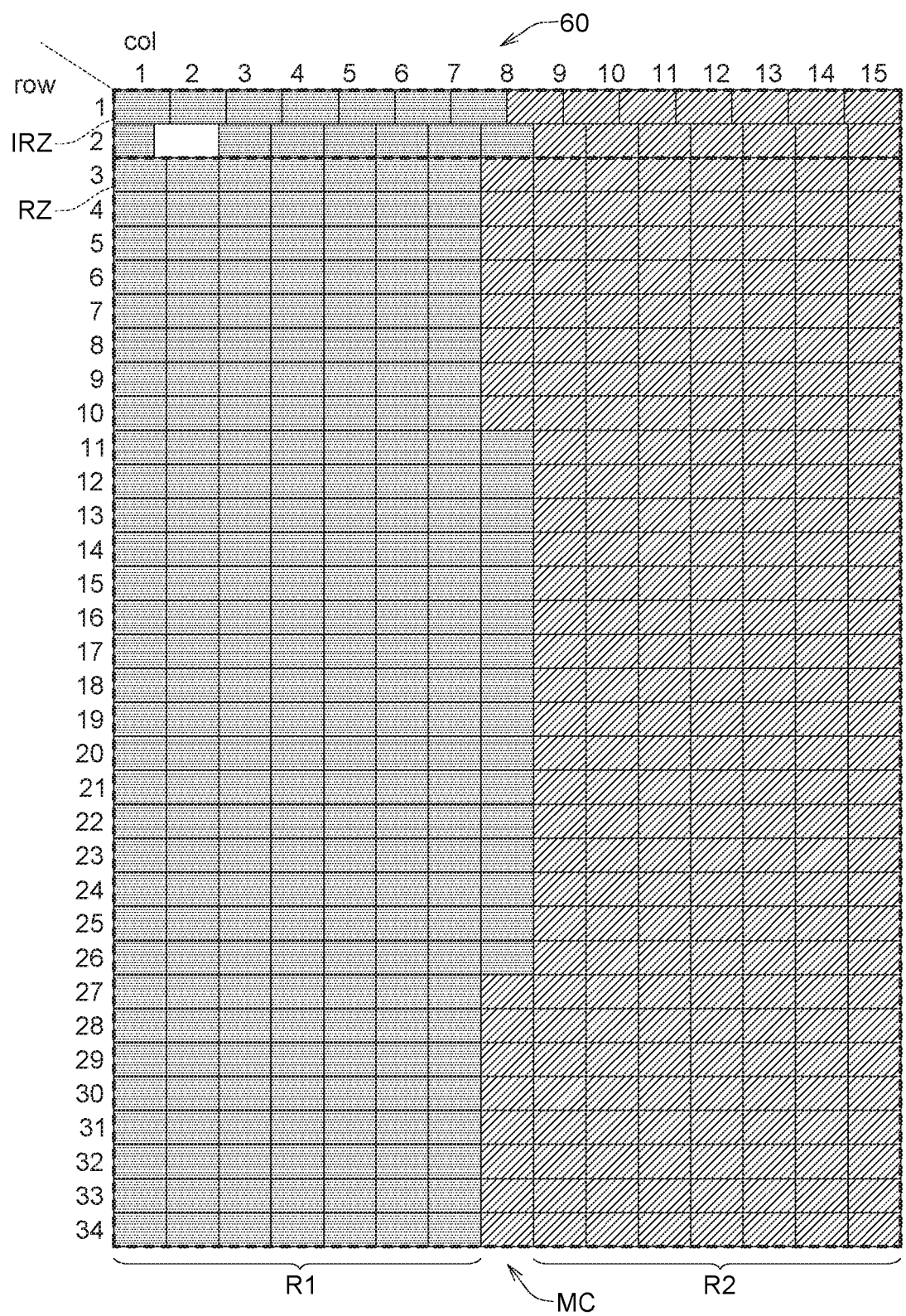
FIG. 6 is an arrangement diagram of the common voltage sources coupled to the touch electrodes according to an alternate embodiment of the invention.

Referring to FIG. 6, an arrangement diagram of the first common voltage source and the second common voltage source coupled to the touch electrodes according to an alternate embodiment of the invention is shown. In the present embodiment, of the touch electrodes in row 2 of the touch display panel 60, a portion of col 1 and col 2 are excavated/removed. The regular region RZ of the touch display panel 60 includes touch electrodes from row 3 to row 34, and the irregular region IRZ includes touch electrodes from row 1 to row 2. The arrangement of the common voltage source in the regular region RZ can be obtained with reference to above embodiments, and the similarities are not repeated here. In the irregular region IRZ, the 15 touch electrodes in row 1 are re-arranged as 14 touch electrodes by way of merging and pitch shift of contacts, the 7 touch electrodes on the left side of the re-allocated 14 touch electrodes are allocated to the second common voltage source VCOML, and the 7 touch electrodes on the right side of the re-allocated 14 touch electrodes are allocated to the first common voltage source VCOMR. Then, the touch electrodes in row 2 are re-arranged as 14 touch electrodes by way of merging and pitch shift of contacts according to the total area of the touch electrodes in row 2, and the total area of the 7 touch electrodes allocated to the first common voltage source VCOMR is substantially equivalent to the total area of the 7 touch electrodes allocated to the second common voltage source VCOML. Thus, under the circumstances that the traces have the same width, the resistive load of the first common voltage source VCOMR and the resistive load of the second common voltage source VCOML will be close to or substantially equivalent to each other.

To summarize, when allocating the common voltage source to which the touch electrodes are coupled under the circumstances that the touch display panel of the touch display device has an odd number of columns of touch electrodes and that the drive chip of the touch display device includes a first common voltage source and a second common voltage source, firstly whether the touch display panel has any irregular regions needs to be determined. If it is determined that the touch display panel does not have any irregular regions, the touch electrodes are divided into a middle column, a first region and a second region, wherein the electrodes in the first region are allocated to the second common voltage source (the one of the two common voltage sources closer to the first region), the electrodes in the second region are allocated to the first common voltage source (the one of the two common voltage sources closer to the second region), the touch electrodes in the middle column are equally divided into a first half and a second half by a reference line, a half of touch electrodes of the first half are allocated to the first common voltage source, the other half of touch electrodes of the first half are allocated to the second common voltage source, a half of touch electrodes of the second half are allocated to the first common voltage source, the other half of touch electrodes of the second half are allocated to the second common voltage source, and preferably the common voltage source of the first half and the second half are mirror symmetric with respect to the reference line. If it is determined that the touch display panel has an irregular region, then whether each row of the irregular region has an even number of touch electrodes is determined respectively. If it is determined that each row of the irregular region has an even number of touch electrodes, then the touch electrodes in the row are equally allocated to the first common voltage source and the second common voltage source. If the number of touch electrodes in a row not an even number, then the odd-number touch electrodes in the row are re-arranged as even-number touch electrodes by way of merging and pitch shift of contacts which are equally allocated to the first common voltage source and the second common voltage source. Besides, when re-allocating the touch electrodes by way of merging and pitch shift of contacts, the touch electrodes can be re-allocated according to the total area of the touch electrodes in the row. For example, the total area of the touch electrodes allocated to the first common voltage source is substantially equivalent to the total area of the touch electrodes allocated to the second common voltage source.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device, comprising:
a drive chip, comprising a first common voltage source and a second common voltage source; and
a touch display panel, comprising a plurality of touch electrodes, wherein the touch electrodes comprise a plurality of rows and a plurality of columns, and the number of columns is odd-numbered,
wherein the touch display panel comprises a middle column, a first region and a second region, the middle column is a column of touch electrodes interposed between the first region and the second region, the first region and the second region have the same number of touch electrodes, the touch electrodes in the first region are coupled to the first common voltage source, the touch electrodes in the second region are coupled to the second common voltage source, the middle column is divided into a first half and a second half by a reference line, the first half and the second half have the same number of touch electrodes, a half of the touch electrodes of the first half are coupled to the first common voltage source, the other half of the touch electrodes of the first half are coupled to the second common voltage source, a half of the touch electrodes of the second half are coupled to the first common voltage source, and the other half of the touch electrodes of the second half are coupled to the second common voltage source.

2. The touch display device according to claim 1, wherein an arrangements of the common voltage sources of the first half and an arrangements of the common voltage sources of the second half are mirror symmetric with respect to the reference line, the arrangement of common voltage sources is a relationship between the touch electrodes of the first half and the second half and the first common voltage source and the second common voltage source.

3. The touch display device according to claim 2, wherein the drive chip is disposed on a side of the touch display panel, a distance between the first common voltage source and the first region is smaller than that between the first common voltage source and the second region, and a distance between the second common voltage source and the second region is smaller than that between the second common voltage source and the first region.

4. The touch display device according to claim 2, wherein the sum of impedances of a plurality of traces coupled between the first common voltage source and the touch electrodes is substantially equivalent to that of a plurality of traces coupled between the second common voltage source and the touch electrodes.

5. A touch display device, comprising:
a drive chip, comprising a first common voltage source and a second common voltage source; and
a touch display panel, comprising a plurality of touch electrodes, wherein the touch electrodes comprise a plurality of rows and a plurality of columns, and the number of columns is odd-numbered,
wherein the touch display panel comprises a regular region and an irregular region, the regular region comprises a middle column, a first region and a second region, the middle column is a column of touch electrodes interposed between the first region and the second region, the first region and the second region have the same number of touch electrodes, the touch electrodes in the first region are coupled to the first common voltage source, the touch electrodes in the second region are coupled to the second common voltage source, the middle column is divided into a first half and a second half by a reference line, the first half and the second half have the same number of touch electrodes, a half of the touch electrodes of the first half are coupled to the first common voltage source, the other half of the touch electrodes of the first half are coupled to the second common voltage source, a half of the touch electrodes of the second half are coupled to the first common voltage source, and the other half of the touch electrodes of the second half are coupled to the second common voltage source.

6. The touch display device according to claim 5, wherein the common voltage sources of the first half and the second half are mirror symmetric with respect to the reference line, the arrangement of common voltage sources is a relationship between the touch electrodes of the first half and the second half and the first common voltage source and the second common voltage source.

7. The touch display device according to claim 6, wherein the drive chip is disposed on a side of the touch display panel, and a distance between the first common voltage source and the first region is smaller than that between the first common voltage source and the second region, and a distance between the second common voltage source and the second region is smaller than that between the second common voltage source and the first region.

8. The touch display device according to claim 6, wherein the sum of impedances of a plurality of traces coupled between the first common voltage source and the touch electrodes is substantially equivalent to that of a plurality of traces coupled between the second common voltage source and the touch electrodes.

9. The touch display device according to claim 6, wherein the number of rows of the touch electrodes in the regular region is a multiple of 4.

10. The touch display device according to claim 5, wherein for each row of the irregular region:
if the number of touch electrodes in the row is even-numbered, a half of the touch electrodes in the row are coupled to the first common voltage source, the other half of the touch electrodes in the row are coupled to the second common voltage source;
if the number of touch electrodes in the row is odd-numbered, the touch electrodes in the row are re-allocated as a plurality of even-numbered first touch electrodes by way of merging and pitch shift of contacts, a half of the first touch electrodes in the row are coupled to the first common voltage source, and the other half of the first touch electrodes in the row are coupled to the second common voltage source.

11. The touch display device according to claim 5, wherein for the touch electrodes in each row of the irregular region, the sum of areas of the touch electrodes coupled to the first common voltage source is substantially equivalent to that of the touch electrodes coupled to the second common voltage source.

* * * * *